(12) United States Patent
Moore et al.

(10) Patent No.: US 12,506,765 B2
(45) Date of Patent: Dec. 23, 2025

(54) CYBER SECURITY

(71) Applicant: Penten Pty Ltd, Braddon (AU)

(72) Inventors: Kristen Moore, Joondalup (AU); Cody Christopher, Joondalup (AU); David Liebowitz, Joondalup (AU)

(73) Assignee: Penten Pty Ltd, Braddon (AU)

( * ) Notice: Subject to any disclaimer, the term of this patent is extended or adjusted under 35 U.S.C. 154(b) by 235 days.

(21) Appl. No.: 18/573,552

(22) PCT Filed: Jul. 15, 2022

(86) PCT No.: PCT/AU2022/050748
§ 371 (c)(1),
(2) Date: Dec. 22, 2023

(87) PCT Pub. No.: WO2023/283697
PCT Pub. Date: Jan. 19, 2023

(65) Prior Publication Data
US 2024/0372885 A1    Nov. 7, 2024

(30) Foreign Application Priority Data

Jul. 16, 2021    (AU) ................ 2021902183

(51) Int. Cl.
*G06N 3/08*    (2023.01)
*G06F 40/56*    (2020.01)
*H04L 9/40*    (2022.01)

(52) U.S. Cl.
CPC .......... *H04L 63/1433* (2013.01); *G06F 40/56* (2020.01); *G06N 3/08* (2013.01)

(58) Field of Classification Search
CPC ........ H04L 63/1433; G06F 40/56; G06N 3/08
See application file for complete search history.

(56) References Cited

U.S. PATENT DOCUMENTS 8,549,643 B1    10/2013  Shou
9,560,075 B2    1/2017   Goldberg et al.
(Continued)

OTHER PUBLICATIONS

PCT/AU2022/050748, Sep. 26, 2022, International Search Report and Written Opinion.
(Continued)

*Primary Examiner* — Robert B Leung
*Assistant Examiner* — Howard H. Louie
(74) *Attorney, Agent, or Firm* — Nutter McClennen & Fish LLP

(57) ABSTRACT

This disclosure relates to a method for generating simulated communication data. A processor trains a model on historical communication data. The model comprises a probability distribution to model time, sender, and recipients and a parameter vector that jointly encodes information from the input event sequence of time value, the sender and the recipients. The probability distribution is based on the parameter vector. The processor generates a collection of simulated communication messages by sampling from the probability distribution to determine a time value, a sender, and recipients of the simulated communication message, wherein the recipients are dependent on the sender of the simulated message. The processor generates a simulated natural language text for the message, which is part of a simulated conversation between the sender and the recipients.

20 Claims, 7 Drawing Sheets

(56) References Cited

U.S. PATENT DOCUMENTS

| | | |
|---|---|---|
| 10,831,452 B1* | 11/2020 | Hunter .................... G06F 8/65 |
| 2009/0241191 A1 | 9/2009 | Keromytis et al. |
| 2020/0053121 A1 | 2/2020 | Wilcox |
| 2020/0193298 A1* | 6/2020 | Hilprecht ............. G06N 3/0455 |
| 2021/0019621 A1* | 1/2021 | Bhattacharyya ........ G06F 18/25 |
| 2021/0056489 A1 | 2/2021 | Wright |
| 2021/0374360 A1* | 12/2021 | Paul ........................ G06N 3/09 |

OTHER PUBLICATIONS

International Search Report and Written Opinion mailed Sep. 26, 2022, in connection with International Application No. PCT/AU2022/050748.

Choudhari et al., Discovering Topical Interactions in Text-based Cascades using Hidden Markov Hawkes Processes. IEEE Xplore 31. International Conference on Data Mining. Dec. 31, 2018. 11 pages.

Moore et al., Modelling Direct Messaging Networks with Multiple Recipients for Cyber Deception. Nov. 21, 2021. arXiv:2111.11932v1 [cs.CR] 17 pages.

* cited by examiner

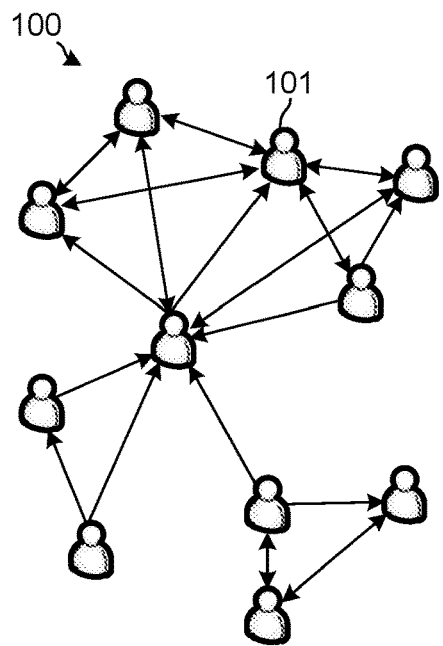
Fig. 1
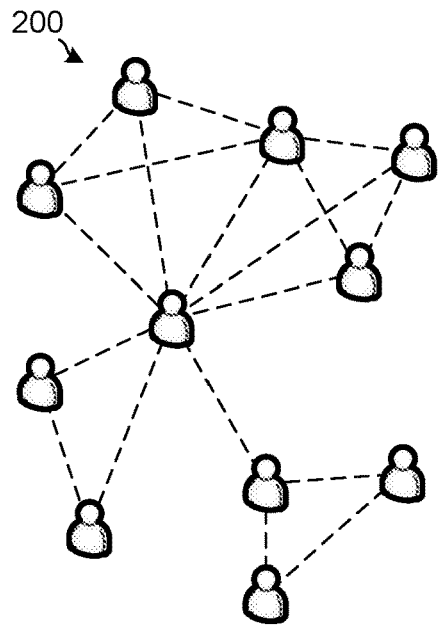
Fig. 2
301 — train a model on historical real communication data
302 — generate a collection of simulated communication messages
303 — determine a sender, recipients and time value
304 — generate a simulated natural language text
305 — store communication data
Fig. 3

CYBER SECURITY

CROSS-REFERENCE TO RELATED APPLICATIONS

The present application is a national stage filing under 35 U.S.C. § 371 of international PCT application PCT/AU2022/050748, filed Jul. 15, 2022, which claims priority under 35 U.S.C. § 119(e) to Australian Provisional Patent Application No 2021902183 filed on Jul. 16, 2021, the entire contents of each of which are incorporated herein by reference.

TECHNICAL FIELD

This disclosure relates to simulating messages to represent simulated conversations on a communication network.

BACKGROUND

Cyber deception is emerging as a promising approach to defending networks and systems against attackers and data thieves, primarily through the use of honeypots. Honeypots are typically fake systems or digital media artefacts that have no utility to legitimate users. Because authorised users have no reason to interact with them, honeypots act as a trap, where interaction provides a strong indication of malicious access. Achieving such engagement from attackers, however, requires high interaction deceptions, with realistic detail and plausible behaviours.

An organisation's email server and communication platforms like MS Teams or Slack are other digital assets that can be simulated to add realism to deceptive systems. For them to be an effective tool for deception, they should exhibit network traffic patterns and contain topical text content that are realistic to moderate scrutiny, so as to entice potential intruders.

One difficulty with realistic traffic patterns is that increased realism often comes it the cost of computational complexity or difficulty parameterising the traffic patterns.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Disclosed herein is a method for creating realistic communication data using a combination of temporal point processes (TPP) to determine the timing, sender and recipients of messages and a trained generation model, such as GPT, to generate realistic body text of these messages. Since the TPP and the GPT are intertwined by way of interrelating parameters, the generated messages are highly realistic.

A method for generating simulated communication data over a communication network comprises:
training a model on historical communication data,
the model comprising a probability distribution to model a conditional density of each of a time value, a sender, and one or more recipients,
the training being performed on an input event sequence consisting of each of multiple communication messages in the historical communication data,
the model comprising a parameter vector that jointly encodes information from the input event sequence of time value, the sender and the one or more recipients of each communication message in the historical input communication data, and
the probability distribution to model a conditional density of each of a time value, a sender, and one or more recipients is based on the parameter vector; and
generating a collection of simulated communication messages to represent one or more simulated conversations over the communication network by repeatedly performing the steps of:
sampling from the probability distribution of the trained model to determine:
a time value for a simulated sending of the simulated communication message,
a sender of a simulated communication message, and
one or more recipients of the simulated communication message, wherein determining the one or more recipients is dependent on the sender of the simulated communication message:
generating a simulated natural language text for the simulated communication message over the communication network, wherein the simulated natural language text is part of a simulated conversation between the sender and the one or more of the recipients, and
storing, relative to the communication network, communication data indicative of the simulated communication message being sent from the sender to the one or more recipients at the time value and including the natural language text.

It is an advantage that the model jointly models sending times and participants and that this model is then used to determine a sender and one or more recipients as well as the time value for a simulated message. As a result, the timing and participants of the simulated communication data is more realistic compared to separate modelling and sampling. Further, the method generates simulated natural language text as part of a conversation between the sender and recipients determined in the previous step. This interrelates the participants with the generated content, which makes the communication data more realistic.

In some embodiments, the parameter vector is an embedding vector that embeds the sending time, the sender and the one or more recipients of each communication message in the historical real communication data.

In some embodiments, the embedding vector is a fixed dimensional vector.

In some embodiments, the embedding vector has multiple vector elements, the model comprises a recurrent neural network (RNN), and training the model comprises training the RNN to thereby calculate the multiple vector elements.

In some embodiments, the neural network is trained with an input that is formed by the sending time, the sender and the one or more recipients of one communication message in the historical communication data.

In some embodiments, determining the one or more recipients comprises:
  performing a classification method to classify one or more of multiple users as recipients; and
  using an output of the classification method as a probability in the probability distribution to model the conditional density of the one or more recipients.

In some embodiments, determining the one or more recipients comprises using a neural network that has the parameter vector as a first input and the sender of the simulated communication message as a second input.

In some embodiments, the method comprises calculating outputs of the neural network that are conditional recipient probabilities conditional on one of multiple potential senders.

In some embodiments, the probability distribution to model the conditional density of the one or more recipients is a categorical distribution formed by the outputs of the neural network.

In some embodiments, the model comprises a point process that generates the time value.

In some embodiments, the parameter vector parameterises the point process to determine the time value.

In some embodiments, the method further comprises, based on the determined sender, the one or more recipients and the time value, updating the parameter vector.

In some embodiments, the method further comprises determining a thread identifier by one of: generating a new thread identifier to represent a new simulated conversation; and selecting an existing thread identifier to reply to or forward an existing simulated conversation.

In some embodiments, generating the simulated natural language text comprises a simulated conversation topic, and determining the one or more recipients is dependent on the conversation topic.

In some embodiments, the trained model is configured to preserve a proportion between messages sent and messages received.

In some embodiments, the method further comprises configuring the model based on user input relating to one or more of: a number of users in the network; habits of the users in the network: topic generation, and tempo and periodicity of communications.

In some embodiments, configuring comprises one or more of adjusting parameters in an intensity function of the model associated with one of the users, and addition or removal of users by increasing or decreasing a number of parameters of the model, respectively.

In some embodiments, the method further comprises extracting keywords to determine a topic that is relevant to a user that starts the simulated conversation.

In some embodiments, the further comprises using the topic as a seed for determining a subject natural language text; and using the subject natural language text as a seed for determining a body natural language text.

In some embodiments, determining the subject natural language text comprises evaluating a first generation model and determining the body natural language text comprises evaluating a second generation model different from the first generation model.

In some embodiments, the trained model is configured to preserve a seasonality of the simulated conversation.

In some embodiments, training the model comprises further training a pre-trained model on real communication messages of an organisation.

In some embodiments, the method further comprises detecting interaction with a device associated with the collection of simulated communication messages to detect malicious activity in the communication network.

In some embodiments, the method is executed in real-time to generate a live communication stream.

In some embodiments, the method further comprises providing the simulated communication message in a training software application.

Software, when executed by a computer, causes the computer to perform the above method.

A system for generating simulated communication data over a communication network comprises:
  a data store configured to store a model that is trained on historical communication data,
    the model comprising a probability distribution to model a conditional density of each of a time value, a sender, and one or more recipients,
    the training being performed on an input event sequence consisting of each of multiple communication messages in the historical communication data,
    the model including a parameter vector that jointly encodes information from the input event sequence of time value, the sender and the one or more recipients of each communication message in the historical input communication data, and
    the probability distribution to model a conditional density of each of a time value, a sender, and one or more recipients is based on the parameter vector; and
  a processor configured to:
    generating a collection of simulated communication messages to represent one or more simulated conversations over the communication network by repeatedly performing the steps of: sampling from the probability distribution of the trained model to determine:
      a time value for a simulated sending of the simulated communication message,
      a sender of a simulated communication message, and
      one or more recipients of the simulated communication message, wherein determining the one or more recipients is dependent on the sender of the simulated communication message:
    generating a simulated natural language text for the simulated communication message over the communication network, wherein the simulated natural language text is part of a simulated conversation between a sender and the one or more of the recipients, and
    storing, relative to the communication network, communication data indicative of the simulated communication message being sent from the sender to the one or more recipients at the time value and including the natural language text.

A method for generating simulated communication data over a communication network comprises:
  training a model on historical real communication data, the model comprising model parameters that jointly model sending times of communication messages and participants of communication messages; and
  generating a collection of simulated communication messages to represent one or more simulated conversations over the communication network by repeatedly performing the steps of:
  using the trained model to determine:
    a sender of a simulated communication message,
    one or more recipients of the simulated communication message, and a time value for a simulated sending of the simulated communication message, generating a simulated natural language text for the simulated communication message over the communication network, wherein the simulated natural language text is part of a simulated conversation between the sender and the one or more of the recipients, and storing, relative to the communication network, communication data indicative of the simulated communication message being sent from the sender to the one or more recipients at the time value and including the natural language text.

A system for generating simulated communication data over a communication network comprises:

a data store configured to store a model that is trained on historical real communication data, the model comprising model parameters that jointly model sending times of communication messages and participants of communication messages; and a processor configured to:
 generate a collection of simulated communication messages to represent one or more simulated conversations over the communication network by repeatedly performing the steps of:
  using the trained model to determine:
   a sender of a simulated communication message,
   one or more recipients of the simulated communication message, and
   a time value for a simulated sending of the simulated communication message,
  generating a simulated natural language text for the simulated communication message over the communication network, wherein the simulated natural language text is part of a simulated conversation between a sender and the one or more of the recipients, and
  storing, relative to the communication network, communication data indicative of the simulated communication message being sent from the sender to the one or more recipients at the time value and including the natural language text.

BRIEF DESCRIPTION OF DRAWINGS

An example will be described with reference to the following drawings:

FIG. 1 illustrates a real communication network.

FIG. 2 illustrates a model representing messages in a communication network.

FIG. 3 illustrates a method for simulating messages in a communication network.

DESCRIPTION OF EMBODIMENTS

Network

Figure 4:
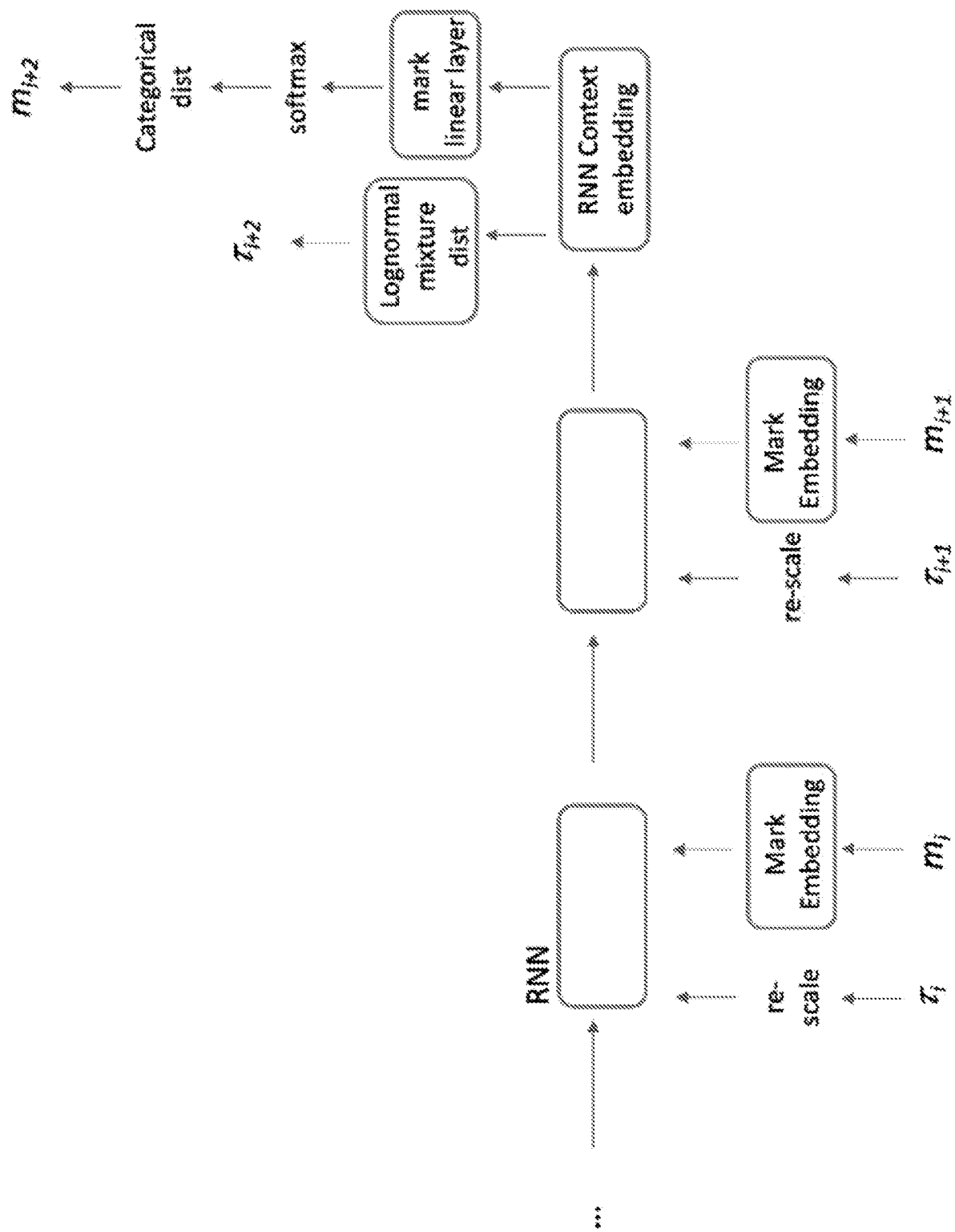
FIG. 4 illustrates sampling with an intensity-free learning (IFL) architecture.

FIG. 1 illustrates an example communication network 100, comprising multiple users, such as example user 101. The users send and receive messages to other users, which is indicated by arrows in FIG. 1. It can be seen that some arrows are bidirectional, which means the two users send and receive messages between them, whereas some arrows are unidirectional, which means that only one user sends messages and the other user only receives the messages. Communication network here does not necessarily imply that the users are connected by physical communication links. Instead, the communication network is formed by the users communicating with each other, so that any user that participates in the communications (as sender, receiver or both) is by definition part of the communication network. The actual transmission of the communication messages can be achieved by any data transport technology an any layer, such as TCP/IP, UDP, Wifi, Fibre Channel Fabric, etc.

The users typically send messages over time so that there is an ongoing sequence of messages that the users send along the arrows shown in FIG. 1. Although the arrows in FIG. 1 only show one-to-one connections for clarity, it is noted that any message may have multiple recipients or may be broadcast to all users. The messages sent between users can be considered as an ordered sequence (ordered by send time), where at each point in time, or period of time (such as 1 s), there may be one or more messages sent from one or more respective users to corresponding recipients.

The messages sent in communication network 100 can be attractive for a number of reason. On one hand, the messages can be used to infer certain information, such as relationships or topics of interest. On the other hand, the messages may be attractive for malicious players to steal information from the users. So there are a number of reasons why it would be useful to have those messages available but it is often undesirable to use the actual messages created by the users. Therefore, this disclosure provides a method for simulating the messages sent over communication network 100. One aim is that the simulated messages are as realistic as possible so that it is difficult to discern a difference to the real communication messages.

Model

To that end, the method uses a model 200 of the communication network as shown in FIG. 2. Model 200 represents historical messages on communication network 100. In that sense, model 200 represents the timing and participants of messages on communication network 100. In one example, model 200 is a stochastic model in the sense that it provides statistics of messages that can be sampled to decide whether to generate a new message at a particular time. Since the model is stochastic, the outcome of the determination of whether to generate a new message can be different if the determination is made twice on the exact same model.

The communication network 100 and the model 200 may take a variety of different forms and types. For example, the messages may be email messages. In other examples, the messages may be social media messages, such as Twitter, Facebook, WhatsApp or Instagram messages or posts. Even further, the messages may be messages in a corporate communication platform, such as Microsoft Teams or Slack. Further, the messages may be tied to a particular communication technology, such as short message service (SMS). In yet a further example, model 200 represents messages of different types. In those cases, users may receive a first message of a first type (MS Teams) and reply with a second message of a second type (Slack).

Method

FIG. 3 illustrates a method 300 for generating simulated communication data over a communication network. Method 300 commences by training model 200 on historical real communication data, such as historical, stored communication messages from real communication network 100. The model comprising model parameters that jointly model sending times of communication messages and participants of communication messages. In one example, the model is a point process, which is, in general a collection of mathematical points randomly located on a mathematical space such as the real line or Euclidean space. Here, the points of the point process are messages that are randomly located on the time axis, which is a one-dimensional Euclidean space. Therefore, the point process used herein can be referred to as a Temporal Point Process (TPP). The TPP can be considered as a stochastic process or being associated with a stochastic process. More details on TPPs are provided below. The TPP has parameters, such as the intensity function parameters, that are adjusted during training to optimally fit the training messages. Further, marks can be introduced as additional elements and parameterised to model participants, such as senders and receivers. Again, the parameters for the marks are tuned to fit the training messages.

Method 300 then generates 302 a collection of simulated communication messages. A collection in this sense is a data structure that stores multiple messages. A collection in this sense can be a list, database, hash table or any other data structure. The simulated communication messages represent one or more simulated conversations over the communication network 100. That is, the simulated messages are not only individual on-off events that only reflect that a message was sent. Instead, the simulated messages are interconnected to form threads and the messages contain natural language text to represent simulated conversations that are on-going in the sense that further messages continue to be generated for a particular thread.

Natural language text in this context means text of a form that is typically created by a human author in a natural conversation. This is in contrast to machine-readable text that is not created by a machine to support a receiving machine to understand the text. Machine readable texts include text code, such as ASCII code including assembler code, HTML code, etc., which are also texts but not natural language. In that sense, natural language text often contains words from a natural language dictionary, such as an English dictionary. The words are often arranged in sentences that follow grammatical rules, such as a typical sentence structure of subject, predicate, object (e.g. dog eats sausage).

According to method 300, the trained model is used to sample a sender of a simulated communication message, one or more recipients of the simulated communication message, and a time value for a simulated sending of the simulated communication message. Again, the model may be a TPP model and may be a single model to represent the time as well as participants. That is, the same model is sampled to determine the time, sender and recipients. More particularly, the single model captures the interdependency between the time, sender and recipients. That is, the point process generates samples characterising the simulated communication messages, each sample comprising the time value, the sender and the one or more recipients. Advantageously, this interdependency (i.e. statistical dependence) is captured in a way that is computationally efficient in the sense that it avoids exponential complexity.

Method 300 then generates 304 a simulated natural language text for the simulated communication message over the communication network. The simulated natural language text is part of a simulated conversation between a sender and the one or more of the recipients. Again, the details are described below but it is noted here that the generation of the natural language text is based on a text generation model that can be trained on the natural language text of real messages, such as email body texts. In one example, the natural language generation is performed by Generative Pre-trained Transformer 3 (GPT-3), which is an autoregressive language model that uses deep learning to produce human-like text. It is the third-generation language prediction model in the GPT-n series (and the successor to GPT-2) created by OpenAI, San Francisco. Advantageously, the output quality of GPT-3 is so high that it is difficult to distinguish it from actual human-created text. Further, GPT-3 can be invoked by an input sequence or seed, so that it is possible to continue conversations with GPT-3 or instruct GPT-3 to generate text on a given subject. The GPT-3 model may be trained on selected messages, such as messages within a corporate network, or may be pre-trained based on general conversations or other corpora of texts.

Finally, method 300 stores 305 the communication data relative to the communication network. The communication data is indicative of the simulated communication message being sent from the sender to the one or more recipients at the time value and including the natural language text. For example, the communication data may comprise server logs that indicate the sending of the messages. In other examples, the communication data comprises the actual messages with time stamps. These messages may be stored on a server on or devices that appear to be operated by respective users.

Overview

This disclosure provides a framework for the end-to-end simulation of social network communications. Each event generated may consist of a timestamp, sender, recipient set, conversation thread id, message type (new thread, reply, forward), and the text of the communication. The approach unites a network TPP model with GPT-based language models. Generates coherent conversation threads about topics relevant to the user that started the conversation thread. The model works in real-time, so that once the generation starts, the generated events will resemble those of a live, active email server or messaging platform. In one example, the method generates realistic content for the purpose of cyber deception Further, this disclosure provides a neural TPP approach to model network communication events, (including multi-cast events). Multi-cast event can be modelled by extending a LogNormMix TPP to model communication networks (ie. sample/model both senders and recipient(s)). This can model multicasting where recipients are not independently sampled-independent sampling leads to recipient sets that were not representative of those seen in training (many combinations that do not exist in the training set). Further the TPP uses the communication topic as metadata to aide recipient selection.

This disclosure further provides an application for TPPs: controlling the generated content—ie. generating social networks that are realistic, but display different temporal dynamics to those seen in the training data. Eg. different size, tempo of generation, different network weights between nodes, etc. This employs the flexibility of trained neural TPPs to generate communication networks unlike those seen in the training data, in a controlled way.

In yet another aspect, this disclosure provides methods to generate email conversation threads using a GPT2-based model to generate email subject about topics of interest to the sender, and a second GPT2-based model to generate the email body, given the email subject line.

Finally, there is provided a framework for evaluating the realism of sampled TPP communication streams for the purpose of cyber deception.

Finally, the proposed method is computationally efficient. More specifically, an improvement of realism can be achieved by including more parameters into a model and making the different parameters dependent on each other. However, in a statistical sense, dependencies between model parameters often lead to exponential complexities because dependent parameters cannot be sampled independently anymore. Instead, all combinations of parameter values are sampled together. This leads to an exponential growth of samples used for training and generation. The disclosed methods reduce this complexity by the disclosed embedding of senders and receivers into the TPP that also generates the time values.

In the context of neural network representations of data sequences, embeddings are a way of representing sequences of data points as vectors. Sequences that are similar (with respect to a cost function that is used in training the neural network) have similar embeddings, so these embeddings serve as concise representations of the raw data in the sequences. In some examples, a recurrent neural network (RNN) learns an embedding vector to encode all the relevant information from the sequential inputs of {sending time, sender, recipients}.

Temporal Point Processes—Modeling Event Streams with TPPs

A TPP is a random process whose realization consists of the times $\mathcal{H} = \{t_i\}$ of isolated events. Examples include earthquakes and their aftershocks, social media posts on an emerging topic, or transactions on a securities exchange. TPPs can be equivalently represented as a sequence of inter-event arrival times $\{\tau_i = t_i - t_{i-1}\}$. When there are two or more types of events, it is called a multivariate point process, and each event is described by a tuple $(\tau_i, m_i)$, denoting the inter-arrival time $\tau_i$ as well as a mark $m_i$ indicating the event type.

A temporal point process is uniquely defined by its conditional intensity function $\lambda^*(t) := \lambda(t | \mathcal{H}(t))$, which defines the rate of event occurrence given the event history, $\mathcal{H}(t)$. (In this report the star is a shorthand notation that reminds us of the dependency on past events.) Formally, it's the probability an event occurs in the interval [t,t+dt) but not before t $$\lambda^*(t) = \frac{Pr(event\ occurs\ in\ interval[t, t + dt) | \mathcal{H}(t))}{dt}$$

The LogNormMix Model

Conditional intensity functions provide a convenient way to specify point processes with a simple predefined behavior. The main challenge of intensity-based approaches lies in choosing a good form for the intensity function. More "simple" intensity functions with closed-form log-likelihood usually have limited expressiveness. On the other hand, more sophisticated intensity functions which can better capture the dynamics of the system use the approximation of the log-likelihood function using Monte Carlo methods.

The conditional intensity function can be expressed in terms of the probability density function $p^*(t) := p(t | \mathcal{H}(t))$ and its cumulative density function $F^*$ as follows $$\lambda^*(t) = \frac{p^*(t)}{1 - F^*(t)}$$

The drawbacks of the intensity-based approaches can be remedied by directly learning the conditional probability density function $p^*(\tau)$ of the time $\tau_i$ until the next event, instead of modeling the intensity function. An "Intensity-free learning" (IFL) approach for conditional density estimation utilises normalizing flows to design flexible and efficient TPP models. The idea of normalizing flows is to define a flexible probability distribution by transforming a simple one. As examples, it is possible to consider the deep sigmoidal flow and sum of squares polynomial flow. A limitation of these approaches, however, is that computing moments and sampling cannot be done in closed form.

To overcome this, it is possible to use the LogNormMix model, a log-normal mixture model which estimates the density $p(\tau)$ using mixture distributions $$p(\tau | \omega, \mu, \sigma) = \sum_{k=1}^{K} \omega_k \frac{1}{\tau \sigma_k \sqrt{2\pi}} \exp - \frac{(\log \tau - \mu_k)^2}{2 \sigma_k^2} \quad (1)$$

where K is the number of mixture components, ω denotes the mixtures weights, and μ and σ are the mixture means and standard deviations, respectively.

The LogNormMix embeds the event history with an recurrent neural network (RNN). When sampling from the trained model, the mark and inter-event time are sampled independently, conditional on the history. The LogNormMix model can be implemented using the normalizing flows framework, but has the additional benefit of closed form sampling and moment computation.

Generative Algorithms for TPPs

The following algorithms are examples for TPPs:

1. Classic multivariate TPP approach: for each node/sender, generate a candidate next event time, the soonest event is chosen and added to event history. Repeat.

2. Basic TPP—most basic approach for modeling the entity. Generate time conditional on history, and independently generate the sender conditional on the history by sampling from a categorical distribution with logits based on the embedded history.

3. Generate from a Hawkes Process in layers—use the background intensity to generate all background events over the entire lifetime of the experiment, then sample from the triggering kernel to generate replies to background events.

Language Models for Conversation Generation

One approach to generating conversation text is to use open domain chatbots, such as Google's Meena, or Facebook's BlenderBot. Another option is OpenAI's Generative Pre-training (GPT)—a large, transformer-based pre-trained model that can be used out of the box for language generation. Input text is given to seed the generation, however it is still hard to control topic of the output.

Plug and Play approaches aim to control the language generated from large, pre-trained language models. An example is the Plug and Play Language Model (PPLM) that employs small, custom attribute-based models to help control the language generated from general pre-trained language models. This results in cheap, but still powerful, conditional generative models. The control extends to the topic and sentiment of text, combines a pre-trained LM with one or more simple attribute classifiers that guide text generation without any further training of the LM.

End-to-End Simulation of Social Network Communications

This disclosure unites three generative models to facilitate the end-to-end real-time simulation of social network communications:

1. TPP model: IFL-recips LogNormMix with marks and metadata (defined below). Marks model the sender and also the recipient(s)). This way, each sample generated by the TPP model comprises the time value, sender and one or more recipients. Metadata is used to capture the seasonality in the data-day of week, time of day, etc.

2. GPT2 email Subject generator: The Stochastic Block Model (SBM) topic model is applied to extract key topics/words for each user. For new threads, email topics are sampled from the SBM topics of the sender, and the topic/keyword is then used to seed the GPT2 email subject generator.

3. GPT2 email body generator: The email subject and existing email thread are used to seed the generation of the email body. (Subject and body are separated because it doesn't do a good job when the tasks are combined as a single model, and because Subject only needs to be generated for new threads.)

Generative Process:

In one example, the method first selects a communication type (e.g., email). In this case, 3 types of communications are considered:
  i) Starting a new conversation thread
  ii) "reply": Replying in an existing conversation thread
  iii) "fwd": Forwarding the existing communication to a new recipient (note: although unrestricted forwarding of communications isn't possible in platforms like Slack, it does have the functionality to share a message from a public channel or a channel the recipient is a member of, to a private message to said recipient).

For each sender, an aim is to ensure the proportions of each communication type (new-thread, reply, fwd) in the rolling simulated content resembles the proportions of that sender from the training data. The pseudocode for email type selection is provided in the following algorithm:

---

IF there's an existing active thread between those participants, and the proportion of replies sent by that sender in the past "recent" time period (eg. 2 months) of simulated events is less than 1.1 times the training dataset proportion
THEN
    email type is "reply"
ELSE IF there's an existing active thread between a subset of those participants, and the proportion of fwd messages sent by that sender in the past "recent" time period (eg. 2 months) of simulated events is less than 1.1 times the training dataset proportion THEN
    email type is "fwd"
ELSE
    email type is "new thread". Generate a new email thread ID.
END IF

---

Full Generative Algorithm:

1. Generate the timestamp, sender and recipients using the IFL-recips TPP model.

2. Sample the communication type (new thread, reply, fwd) based on proportions from that sender in the training data. (Process described in algorithm).

3. Depending on communication type, sample thread ID or generate Subject.
  if "reply"/"fwd" communication:
    i) sample a conversation thread to respond to: consider recently active conversation threads appropriate for the chosen recipients and communication type, in accordance with algorithm.
    ii) inherit the thread ID from the selected thread.
  else if "new thread":
    i) generate email Subject: Sample a topic from the sender's keywords extracted by hierarchical stochastic blockmodels (HSB) model. Feed that topic into GPT2 as the prompt for the generation.
    ii) assign a new thread ID.

4. Generate communication text.
  if "fwd" communication: select from canned list of responses for "forward"-type emails.
    else: generate email text by passing the email subject (and existing email thread) to the GPT2 model as a prompt and asking it to generate 2 sentences of text.

IFL-Recips for Multi-Cast Social Network Event Simulation

FIG. 4 illustrates a LogNormMix model architecture for learning a marked temporal point process. In particular, the inter-event time and marks are conditionally independent of each other, given the history. The implementation assumes the mark space is modeled by a single categorical input.

This disclosure provides a number of approaches to extend this architecture to model network communication events. These include different recipient embedding approaches, with different recipient classification approaches, and with modeling the recipient distribution conditional on senders, versus treating them as conditionally independent.

To extend this architecture to model communication events in a social network of size n, an event is represented by the tuple $(\tau_i, s_i, r_i)$, where $s_i$ denotes the sender (represented by an integer between 1 and n), and $r_i$ denotes the recipient list (represented by an n-dimensional multi-hot vector where unit entries denote the recipients for event i).

Recipient Embedding

There are 3 potential embedding approaches for the recipients.

Standard lookup embedding: For this approach a recipient ID is assigned to each unique recipient set observed in the training data, and then use a lookup embedding for the recipient ID, similar to that used to embed the sender input data.

Fully connected embedding: The lookup embedding approach may not be the best choice in this situation, since there will be many different recipient combinations and some may be rare. An alternative is to encode the recipients with 2 fully connected layers.

Smooth Inverse Frequency: Another potential approach to improve upon the standard lookup embedding is with the Smooth Inverse Frequency (SIF), a sentence embedding approach that represents the sentence by a weighted average of the word vectors, and then modifies them a bit using PCA/SVD. This approach is used to learn a lookup embedding for the user id, exactly as done with the sender embedding, and then embed recipients sets using the modified weighted average of the user id embedding.

Recipient Classification

Since multiple recipients may be selected for each event, recipient classification is a multi-label classification problem. Three options for modeling this classification problem are provided:

Multi-Label Binary Classification

One approach to multi-label classification is to independently train a binary classifier for each label. In the communication network setting, a binary classifier would be trained for each user/node in the network to predict whether the user is a recipient or not. In the typical binary relevance formulation, each single classifier operates independently, without any regard to other labels. For this reason, it would be interesting to instead try a classifier chain approach, where labels are predicted sequentially, and the output of all previous classifiers is input to subsequent classifiers.

Multi-Class Classification

In this approach, the multi-label problem is transformed into a standard multi-class classification problem by creating an ID for each of the recipient set combination seen in the training set. The power set of all the recipients may be too large an output set for a multi-class classification problem. However, a much smaller subset of recipients may be observed in the data, as many people in an organisation will never communicate with each other. Still this approach may not work well on small datasets where there are many different recipient combinations, or for rare recipient combinations.

Multi-Label Multi-Class Classification

Ultimately the problem to be solved is multi-label multi-class classification, where each person in the network is classified as either i) the sender, ii) a recipient, or iii) not included in the event. This approach can be achieved via extending the multi-label classification approach to classify each label as either sender, a recipient or nothing. This enables the sender and recipients to be selected at the same time, but senders and recipients would be treated as conditionally independent if using the standard multi-label classification approach of independently sampling each label.

Implementations

Model Senders and Recipients as Conditionally Independent

Method 300 models inter-event times, senders and recipients as conditionally independent of each other, given the history. The conditional independence assumption between senders and recipients is one approach to modeling the mark space.

Figure 5:
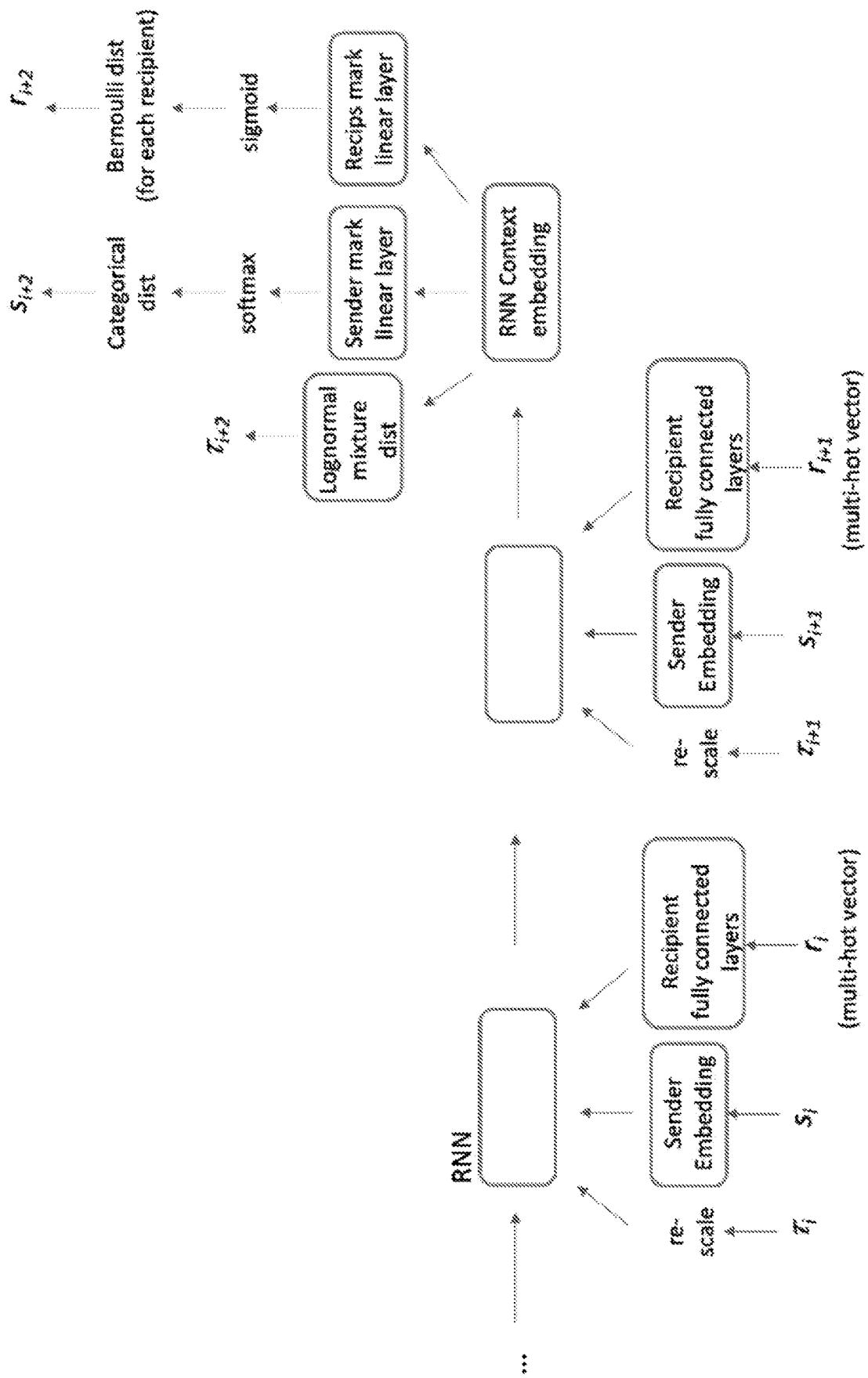
FIG. 5 illustrates another example of sampling with an IFL-recips architecture.

FIG. 5 illustrates an example implementation, using the fully connected recipient embedding and the multi-label binary classification approach. The components in boxes denote learnable parameters.

The embedded recipients $r_i$, are concatenated with the re-scaled time-delta, $\tau_i$, and the sender-embedding, $s_i$, to form the history input vector $h_i=[\tau_i\|s_i\|r_i]$. As in the previous IFL implementation, the history is then processed with a recurrent neural network (RNN) and embedded into a fixed-dimensional vector $h_i \in \mathbb{R}^n$. The history embedding is then concatenated with the embedded metadata $y_i$ to form the context embedding $c_i=[h_i\|y_i]$. The next inter-event time $\tau_{i+1}$ and the next sender $s_{i+1}$ are then obtained from the context embedding as in the previous implementation. The choice of the next recipient set $r_{i+1}$, is a multi-label prediction task—i.e. the method computes the binary cross-entropy for each class separately and then sum them up to obtain the complete recipient loss.

In one example, the internal parameters of the RNN are specific for one generated message. In that sense, the RNN parameters for the current message represent the history of previous messages. The RNN is then used to calculate (i.e. predict) at its output the time, sender and one or more receivers for the current message. The input to the RNN is the time, sender and one or more receivers of the previous message, which may be from the same thread. Once the current message is generated, the RNN parameters are updated to generate the next message. This is indicated in the FIGS. 4-6, where the same RNN is used for each message but the internal parameters are different because they are updated after each time a message is generated.

Jointly Model Senders and Recipients: Recipients Conditioned on the Sender.

This example learns a multi-class recipient classifier for each sender. This is achieved by architecturally factorizing the recipient module into sender-conditioned recipient probabilities.

The sender-conditioned recipients probability $P(R(h_i)=r|S(h_i)=s)$ can be modeled using a fully connected (FC) linear layer and a softmax probability in the network as follows:

$$P(R(h_i) = r|S(h_i) = s) = \text{softmax}(FC_{R|S=s}(h_i))$$

Figure 6A:
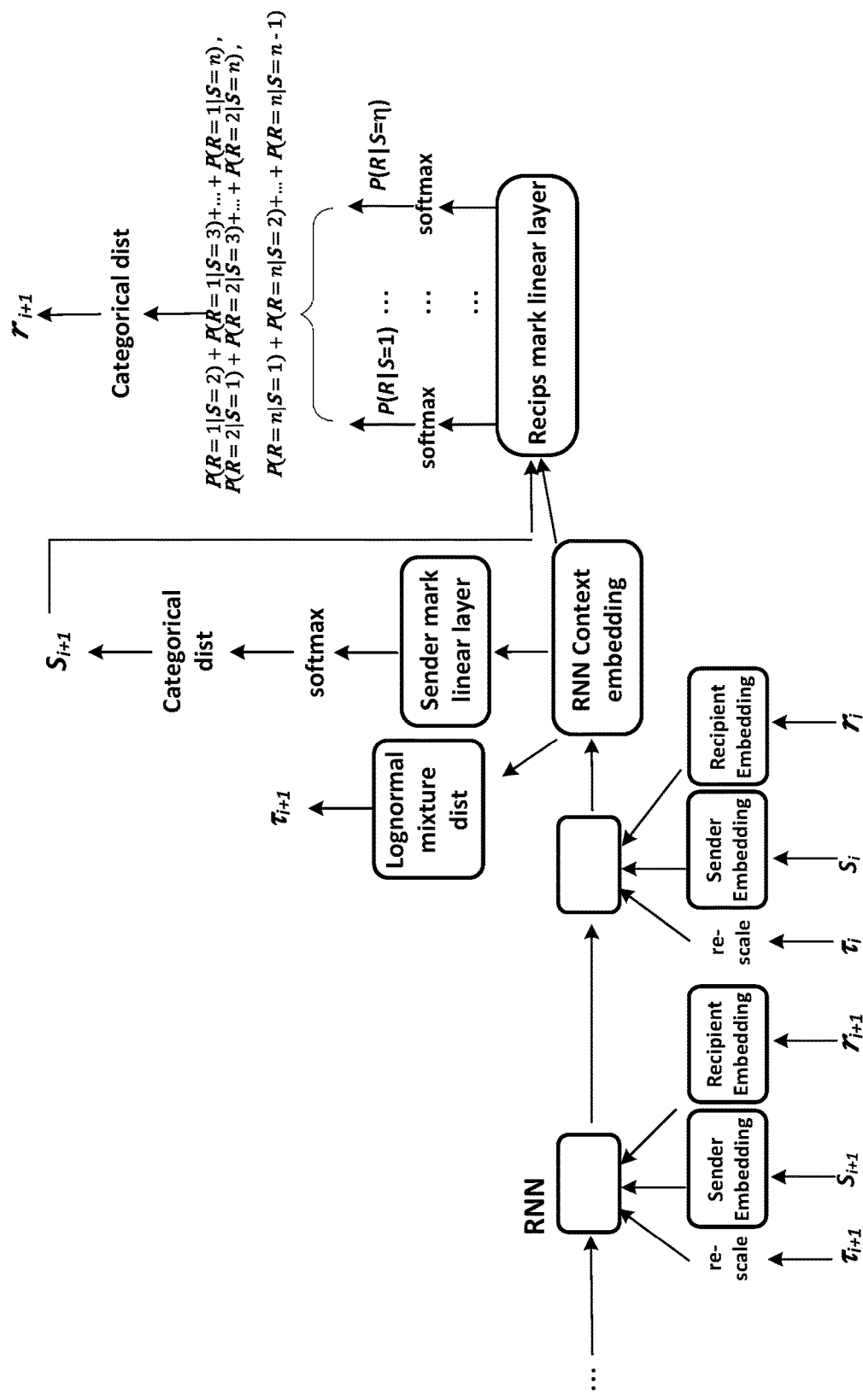
FIG. 6a illustrates an example IFL-recips conditional architecture.

FIG. 6a illustrates one example, where the final recipient probability is calculated in terms of the marginal sender probability, $P(S(h_i)=s)$, as $$P(R(h_i) = r) = P(R(h_i) = r|S = 1) + P(R(h_i) = r|S = 2) + \ldots + P(R(h_i) = r|S = n).$$

Figure 6B:
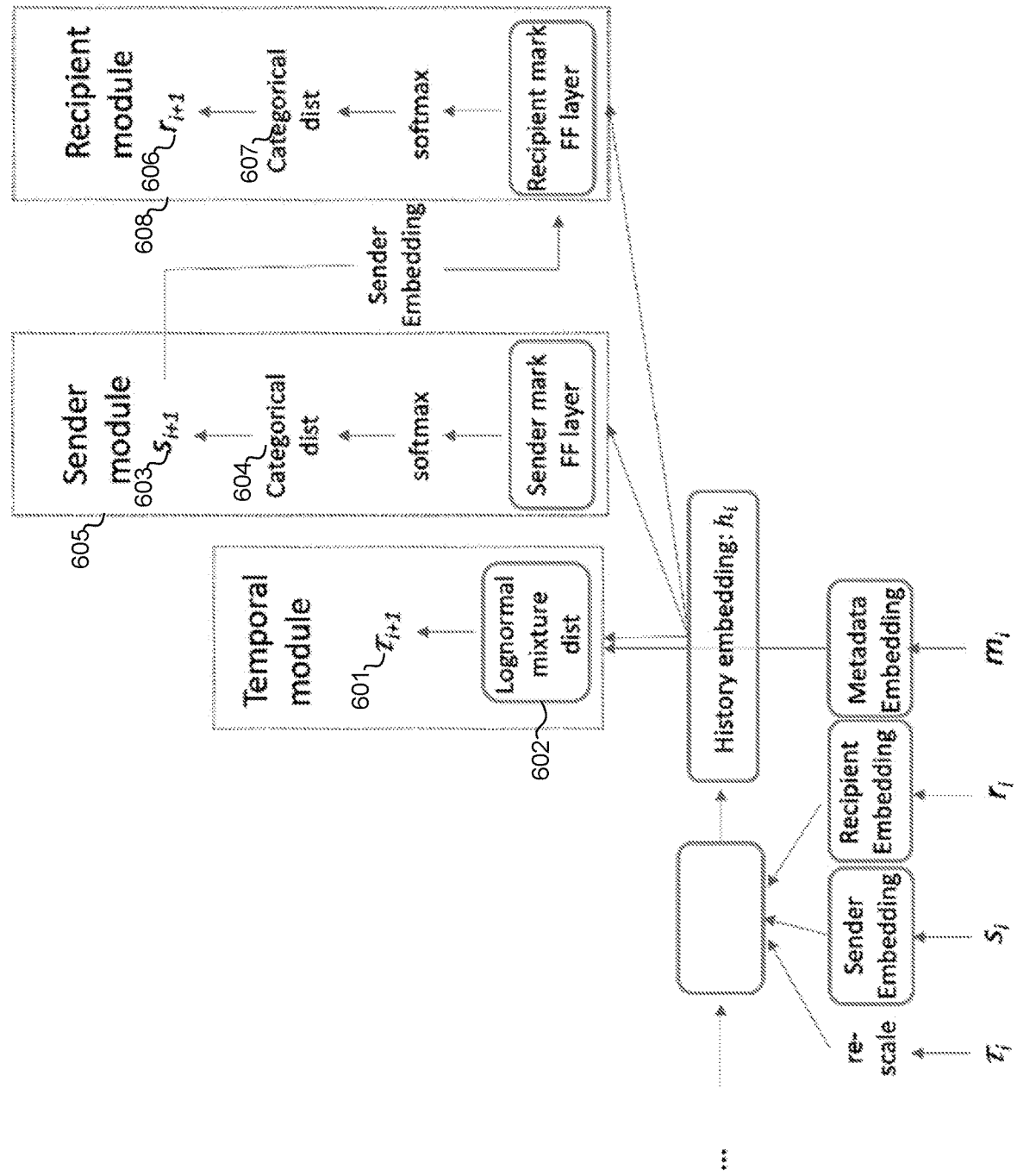
FIG. 6b illustrates another IFL-recips conditional architecture.

FIG. 6b illustrates another example architecture, which shows how the sending time $\tau_{i+1}$ 601 is sampled from the Lognormal Mixture distribution 602. The sender $s_{i+1}$ 603 is sampled from a categorical distribution 604 determined by the "Sender module" 605. The sender module consists of a feedforward network plus softmax, with the output logits defining a categorical distribution across all the nodes in the network. For prediction tasks, the next sender $s_{i+1}$ is predicted to be the class with the highest probability. In some examples, the feedforward network consists of two fully connected layers separated by a tanh activation layer.

Figure 7A:
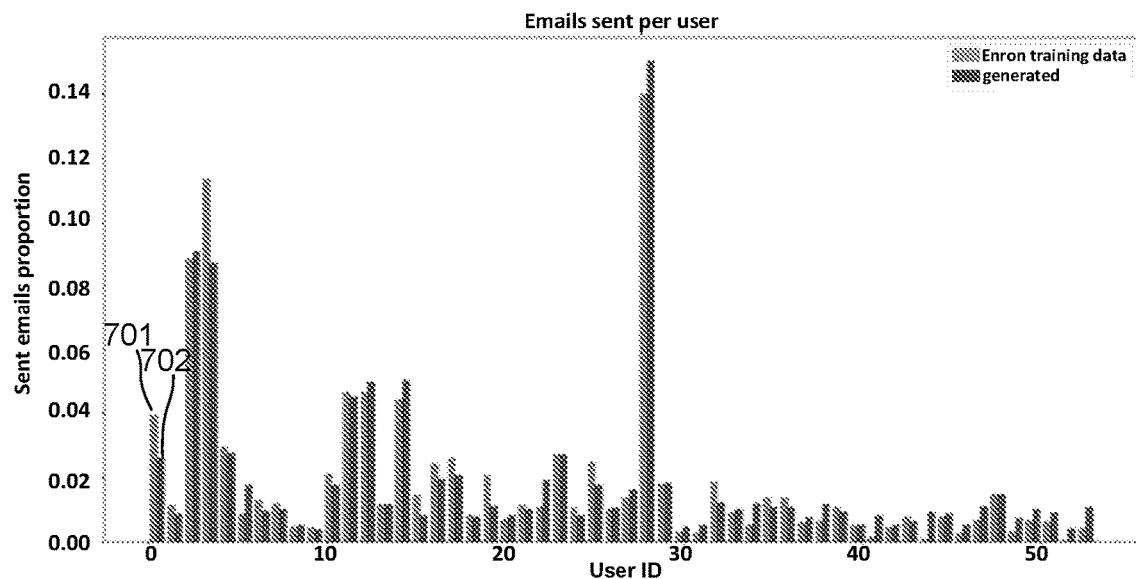
FIG. 7a illustrates a comparison of the distribution of counts of sent emails per user ID.

The recipient set $r_{i+1}$ 606 is sampled from the categorical distribution 607 determined by the "Recipient module" 608. It is noted that recipient module 608 models the conditional probability of choosing each recipient set $r_{i+1}$ given the sender $s_{i+1}$. More particularly, the recipient selection is formulated as a multi-class classification problem by creating an ID for each of the recipient set combinations seen in the training set. Then similar to the sender module, a fully connected layer plus softmax is used to learn a categorical distribution across all the recipient IDs in the dataset. In order to condition the recipient selection probability distribution on the sender, the method concatenates the history context embedding with the sender embedding (i.e. the embedding of the ground truth sender), and passes that as input into the recipient selection module 608. As with the sender module, for prediction tasks, the next recipient $r_{i+1}$ is predicted to be the class with the highest probability. Experiments FIG. 7a illustrates sent email proportions for each of multiple user identifiers. For each identifier, FIG. 7a shows two bars where the first bar is the sent email proportion in the Enron training data and the second bar is the sent emails proportion of emails generated according to the methods disclosed herein. For example, for user identifier '0' the training data has a sent emails proportion of about 0.04 (shown at 701) while the generated data has a proportion of about 0.025 (at 702). Overall, it can be seen that the sent emails proportions of the generated emails is close to the sent emails proportions in the training data. This means that the proposed methods preserve the sent emails proportions well.

Figure 7B:
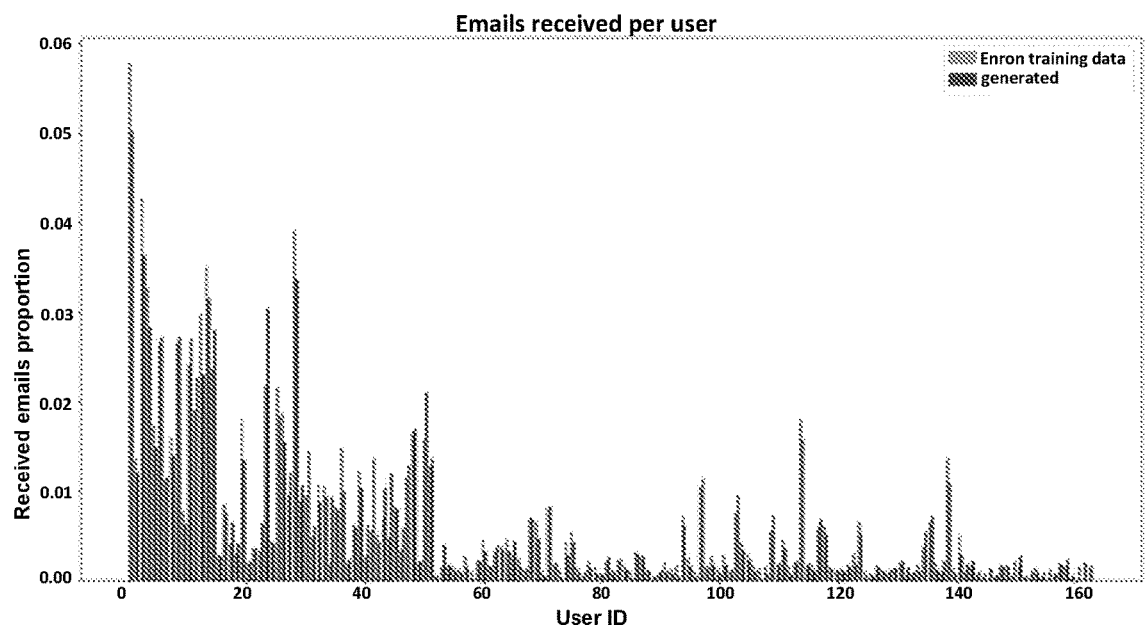
FIG. 7b illustrates a comparison of the distribution of counts of received emails per user ID.

FIG. 7b illustrates similar data to FIG. 7b but now it is the emails received per user. Again, the data shows that the proposed methods preserve the proportions of emails received per user well.

Computer System

Figure 8:
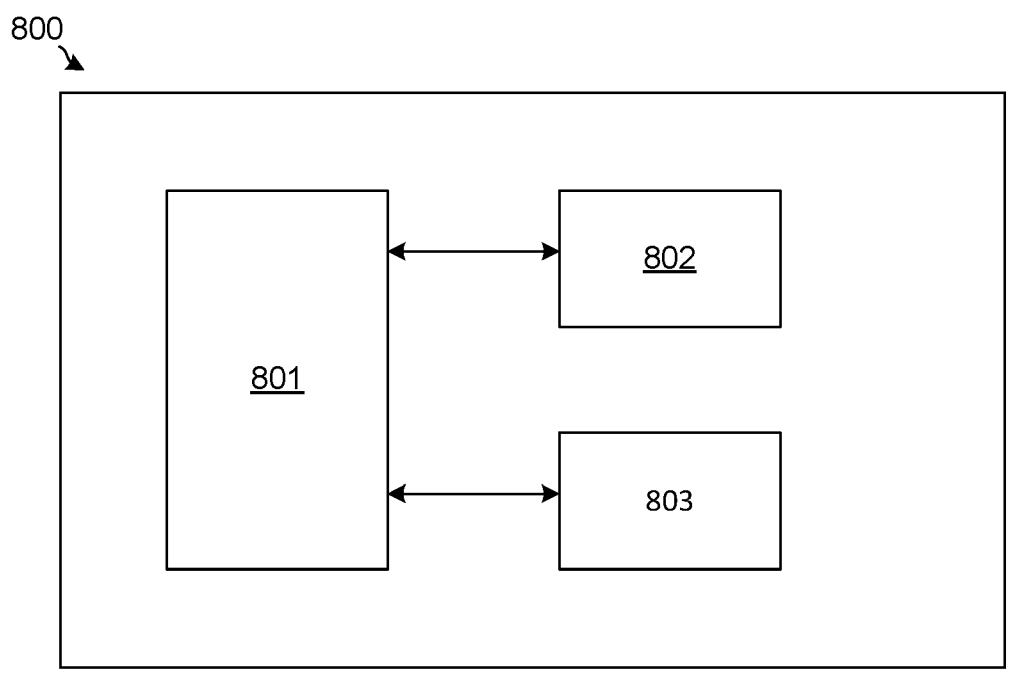
FIG. 8 illustrates a computer system for generating simulated communication messages.

FIG. 8 illustrates a computer system 800 for generating simulated communication data over a communication network as described above. Computer system 800 comprises a processor 801, program memory 802 and a data store 803:

Data store 803 is configured to store a model, such as a TPP model comprising an RNN, that is trained on historical real communication data. The model comprises model parameters that jointly model sending times of communication messages and participants of communication messages.

Processor 801 is configured, by way of program code to perform the method of FIG. 3. The program code is stored on program memory 802, which is a non-transitory computer-readable medium. The program code causes processor 801 to perform method 300 in FIG. 3. That is, processor 801 generates a collection of simulated communication messages by using the trained model to determine a sender of a simulated communication message, one or more recipients of the simulated communication message, and a time value for a simulated sending of the simulated communication message. Processor 801 then generates a simulated natural language text for the simulated communication message over the communication network and stores, relative to the communication network, communication data indicative of the simulated communication message being sent from the sender to the one or more recipients at the time value and including the natural language text.

Comments

The disclosed approach still models the event time and participants as conditionally independent given the history. Other approaches include mimicking the Neural Hawkes architecture and directly modeling the distribution of n inter-event times separately, using a shared RNN to process the history. Alternatively, the conditional independence assumption could be removed using a mixture distribution:

$$p(\tau, m|\mathcal{H}) = \sum_z p(\tau|z, \mathcal{H})p(m|z, \mathcal{H}).$$

Controllable Simulation of Social Networks

In one example, the goal is to leverage a pre-trained TPP model, rather than training a model again from scratch using a dataset with the temporal and network dynamics to mimic. Given a pre-trained TPP model on a network of size n, a smaller network of size m<n can be implemented by sampling a subset of m nodes and then sampling events from the pre-trained TPP and rejecting any events that are sent from or to a user that is not in the smaller network of size m. TPP-based community detection approaches can be used to select a more meaningful sub-network of size m from the original network.

Creating a larger network of size o>n uses the addition of new marks to the mark embedding space, as well as an increase in the overall tempo of network generation, to account for the larger network size. This would be facilitated by fine-tuning the pre-trained model on training data of the target network size o.

Generating Coherent Conversation Threads about User-Specific Topics

By fine tuning the GPT language model on an organisation's e-mail server dataset, e-mails can be generated that, in isolation, sound appropriate to the organisation. However, a more sophisticated approach is used to simulate an office network where each individual has consistent topics and themes to their communications, and conversations threads are coherent and stay on topic.

In cases where no labelled e-mail corpus is available, it is difficult to use approaches where attribute-specific generation is facilitated through training on annotated conversational datasets. Instead, it is possible to leverage GPT2 (or PPLM) and a topic model to generate multi-party e-mail threads about topics of interest to the person that initiated the thread. The proposed implementation does still fine-tune the pre-trained GPT-2 model on the email dataset, however this dataset need not be labelled.

The topic model is used to extract a set of topics/keywords that signify the interests of each user. One model is then trained to generate the email subject, and a separate model to generate the email body. Control of the topic of conversation threads is achieved by seeding the subject generation model with a topic from the sender's keywords. Email bodies are then generated by seeding the email body generator with the email subject (plus the existing email thread, in the case of reply/forward emails).

Various fine-tuning strategies were compared, including creating a training dataset that takes into account the entire conversation thread of each communication, instead of just treating communications independently.

Measuring the Goodness of Fit

The following approaches may be used:

Generalised Score (GS) statistic

AIC score rewards

Q-Q plot and autocorrelation check

Realism Checks

1. Seasonality is preserved: tempo of event generation highest during "office hours", very low on weekends and over night.
2. Sender distribution: generated sender event counts follow same distribution as that of training data.
3. Recipient distribution: generated recipient event counts follow same distribution as that of training data.
4. Sender specific topics.

Applications

As stated above, the method disclosed herein generates a collection of simulated communication messages to represent one or more simulated conversations over the communication network. This collection of messages may be stored on real devices to create an impression of a real communication network. The devices, such as servers, with further data stored thereon, such as an operating system, can then work as a honey pot. This means that external attackers may identify these servers and assume that the servers host a real communication network. The attackers would then aim to make contact, such as by attempting to login or creating a ssh connection with the server. Since the server is only a deception, no external users should ever need to interact with the server. Therefore, any interaction, such as the connection attempt, can be detected as malicious behaviour.

In a further example, the simulated messages can be used for training purposes, which may also be referred to as "synthetic training data". The training can be training for a human operator, or can be training for a machine learning process that aims to predict conclusions based on the simulated messages. For example, it may be possible to train a machine learning model on the simulated messages and then use the trained model to classify real communication messages created by real users.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for generating simulated communication data over a communication network, the method comprising:
    training a model on historical communication data,
        the model comprising a probability distribution to model a conditional density of each of a training time value, a training sender, and one or more training recipients,
        the training being performed on an input event sequence consisting of each of multiple communication messages in the historical communication data,
        the model comprising a parameter vector that jointly encodes information from the input event sequence of the training time value, the training sender and the one or more training recipients of each communication message in the historical input communication data, and
        the probability distribution to model the conditional density of each of the training time value, the training sender, and the one or more training recipients is based on the parameter vector; and
    generating a collection of simulated communication messages to represent one or more simulated conversations over the communication network by repeatedly performing steps of:
        sampling from the probability distribution of the trained model to determine:
            a simulated time value for a simulated sending of the simulated communication message,
            a simulated sender of a simulated communication message, and
            one or more simulated recipients of the simulated communication message, wherein
            determining the one or more simulated recipients is dependent on the simulated sender of the simulated communication message;
        generating a simulated natural language text for the simulated communication message over the communication network, wherein the simulated natural language text is part of a simulated conversation between the simulated sender and the one or more of the simulated recipients, and
        storing, relative to the communication network, communication data indicative of the simulated communication message being sent from the simulated sender to the one or more simulated recipients at the simulated time value and including the natural language text.

2. The method of claim 1, wherein the parameter vector is an embedding vector that embeds the training time value, the training sender and the one or more training recipients of each communication message in the historical real communication data.

3. The method of claim 2, wherein the embedding vector is a fixed dimensional vector and the embedding vector has multiple vector elements, the model comprises a recurrent neural network (RNN), training the model comprises training the RNN to thereby calculate the multiple vector elements, and the neural network is trained with an input that is formed by the training time value, the training sender and the one or more training recipients of one communication message in the historical communication data.

4. The method of claim 1, wherein determining the one or more simulated recipients comprises:
    performing a classification method to classify one or more of multiple users as respective recipients; and
    using an output of the classification method as a probability in the probability distribution to model the conditional density of the one or more training recipients.

5. The method of claim 1, wherein determining the one or more simulated recipients comprises using a neural network that has the parameter vector as a first input and the simulated sender of the simulated communication message as a second input, the method comprises calculating outputs of the neural network that are conditional recipient probabilities conditional on one of multiple potential simulated senders, and the probability distribution to model the conditional density of the one or more training recipients is a categorical distribution formed by the outputs of the neural network.

6. The method of claim 1, wherein the model comprises a point process that generates the simulated time value and the parameter vector parameterises the point process to determine the simulated time value.

7. The method of claim 1, further comprising, based on the determined simulated sender, the one or more simulated recipients and the simulated time value, updating the parameter vector.

8. The method of claim 1, further comprising determining a thread identifier by one of:
    generating a new thread identifier to represent a new simulated conversation; and
    selecting an existing thread identifier to reply to or forward an existing simulated conversation.

9. The method of claim 1, wherein
    generating the simulated natural language text comprises a simulated conversation topic, and
    determining the one or more simulated recipients is dependent on the conversation topic.

10. The method of claim 1, wherein the trained model is configured to preserve a proportion between messages sent and messages received.

11. The method of claim 1, further comprising configuring the model based on user input relating to one or more of:
    a number of users in the network;
    habits of the users in the network;
    topic generation, and
    tempo and periodicity of communications
    wherein configuring comprises one or more of:
    adjusting parameters in an intensity function of the model associated with one of the users, and
    addition or removal of users by increasing or decreasing a number of parameters of the model, respectively.

12. The method of claim 1, further comprising
    extracting keywords to determine a topic that is relevant to a user that starts the simulated conversation;
    using the topic as a seed for determining a subject natural language text; and
    using the subject natural language text as a seed for determining a body natural language text.

13. The method of claim 12, wherein determining the subject natural language text comprises evaluating a first generation model and determining the body natural language text comprises evaluating a second generation model different from the first generation model.

14. The method of claim 1, wherein the trained model is configured to preserve a seasonality of the simulated conversation.

15. The method of claim 1, wherein training the model comprises further training a pre-trained model on real communication messages of an organisation.

16. The method claim 1, wherein the method further comprises detecting interaction with a device associated with the collection of simulated communication messages to detect malicious activity in the communication network.

17. The method of claim 1, wherein the method is executed in real-time to generate a live communication stream.

18. The method of claim 1, further comprising providing the simulated communication message in a training software application.

19. A non-transitory computer readable medium with software code stored thereon that, when executed by a computer, causes the computer to perform the method of claim 1.

20. A system for generating simulated communication data over a communication network, the system comprising:
- a data store configured to store a model that is trained on historical communication data,
  - the model comprising a probability distribution to model a conditional density of each of a training time value, a training sender, and one or more training recipients,
  - the training being performed on an input event sequence consisting of each of multiple communication messages in the historical communication data,
  - the model including a parameter vector that jointly encodes information from the input event sequence of the training time value, the training sender and the one or more training recipients of each communication message in the historical input communication data, and
  - the probability distribution to model the conditional density of each of the training time value, the training sender, and one or more training recipients is based on the parameter vector; and
- a processor configured to perform:
- generating a collection of simulated communication messages to represent one or more simulated conversations over the communication network by repeatedly performing the steps of:
  - sampling from the probability distribution of the trained model to determine:
    - a simulated time value for a simulated sending of the simulated communication message,
    - a simulated sender of a simulated communication message, and
    - one or more simulated recipients of the simulated communication message, wherein determining the one or more recipients is dependent on the sender of the simulated communication message;
  - generating a simulated natural language text for the simulated communication message over the communication network, wherein the simulated natural language text is part of a simulated conversation between the simulated sender and the one or more of the simulated recipients, and
  - storing, relative to the communication network, communication data indicative of the simulated communication message being sent from the simulated sender to the one or more simulated recipients at the time value and including the natural language text.

* * * * *